May 14, 1935. F. T. COURT 2,001,079
COTTON HARVESTER
Original Filed March 4, 1931 5 Sheets-Sheet 1

May 14, 1935.  F. T. COURT  2,001,079
COTTON HARVESTER
Original Filed March 4, 1931  5 Sheets-Sheet 4

Inventor
Frank T. Court

Witness
Milton Lenoir

By Brown, Jackson, Boettcher & Dienner
Attorneys

Patented May 14, 1935

2,001,079

UNITED STATES PATENT OFFICE 2,001,079

COTTON HARVESTER

Frank T. Court, Moline, Ill., assignor to Deere & Company, Moline, Ill., a corporation of Illinois Application March 4, 1931, Serial No. 519,926
Renewed August 6, 1934

32 Claims. (Cl. 56—14)

The present invention relates to harvesters, and more particularly to a cotton harvester adapted to be mounted upon a general purpose tractor and to be operated by suitable power take-off connections therefrom. While the present invention has particular application to two-row harvesters because of the desirability of a mechanism of large capacity and rapidity of operation, it will be understood that the invention may be also embodied in a one-row machine.

More specifically, the present invention may be characterized as an improvement upon the machine disclosed in my copending application Serial No. 439,888, filed March 29, 1930, for Harvester.

In general, the aforementioned application discloses a cotton harvester comprising a pair of forwardly and downwardly directed stripping mechanisms each provided with a pair or set of stripping rolls mounted forwardly and in advance of the tractor with which the mechanisms are associated for transport and operation, such stripping rolls being provided with radially outwardly projecting prongs or fingers which by cooperative function strip the cotton bolls from the plant stalks as the plants of two adjacent rows are guided between the stripping rolls of the respective stripping mechanisms. The cotton bolls removed from each row of plants by the stripping mechanisms are carried rearwardly of each stripping mechanism into a combined conveyor and preliminary cleaner associated with each stripping mechanism, this combined conveyor and preliminary cleaner carrying the stripped matter rearwardly and concurrently separating the cotton from the bolls and breaking up all stalks and twigs stripped from the cotton plants together with the cotton bolls. Each combined conveyor and preliminary cleaner discharges into a final cleaner, whence the cotton is then delivered to suitable receptacles or containers for transport.

With the above in view, it is an object of the present invention to provide improved stripping mechanisms wherein the number of operating parts is materially reduced thereby considerably reducing the weight of each stripping mechanism resulting in a lighter mechanism which may be manufactured at a reduced cost.

Another object resides in the provision of improved means for conveying the matter stripped from the plants rearwardly of each stripping mechanism and concurrently subjecting such stripped matter to a cleaning step thereby materially reducing the amount of foreign matter normally stripped from the plants with the cotton bolls. This combined conveying and cleaning means is further so constructed and arranged as to provide a cooperative function between it and the means stripping the stripped matter from the plant stripping means so that in addition to the normal function of such conveying and cleaning means as such, such means serves to materially aid in stripping matter from the plant stripping means.

A further feature of the present invention resides in the provision of such an arrangement of parts that the stripping mechanism conveying and cleaning means is adapted to discharge directly into the combined conveyors and preliminary cleaners rendering the preliminary cleaning and conveying operation of the present mechanism a substantially continuous one from the stripping means to the final cleaning means. In the embodiment disclosed in the aforementioned copending application, the conveying means disclosed in the stripping means is adapted to merely function as such and each stripping means is provided with an openwork bottom to provide for dropping out therethrough of such foreign matter as may seep down to such openwork bottom, so that such cleaning function as may be attributed thereto is merely incidental to the conveying function of the conveying means. This conveying means is adapted to discharge into a hopper provided in the forward end of each of the combined conveying and preliminary cleaning means, whence it is adapted to be picked up and conveyed and concurrently cleaned during its rearward passage to the final cleaning means. Thus, the preliminary cleaning function attributable to this structure is discontinuous and takes on a positive cleaning function at the point of reception of the stripped matter by the combined conveyors and preliminary cleaners. In the present embodiment, the combined conveyors and cleaners of each stripping mechanism are such as to actually imposes a cleaning step upon the stripped matter, the combined conveyors and preliminary cleaners being so arranged as to receive the matter discharged by the stripping mechanism for continuous combined conveying and cleaning effect rendering the preliminary cleaning of the stripped matter one of continuous effect from substantially the initial portions of the stripping mechanisms to the discharge ends of the combined conveyors and preliminary cleaners into the final cleaners. Thus whereas in the aforementioned copending application structure, a space is utilized as a hopper for receiving matter discharged by the stripping means, in the present embodiment, it is possible to utilize such space for an additional cleaning means considerably improving the cleaning effect of the combined conveyors and preliminary cleaners.

Another feature of the present invention resides in the provision of supporting means such, for example, as wheeled or runner means for the forward ends of the stripping mechanisms which is so disposed as to be completely shielded from the plants operated upon whereby guiding of the stripping mechanisms along the plant rows is rendered accurate. By completely shielding the supporting means for the forward ends of the stripping mechanisms, these means do not run down, collide, contact, or brush up against overhanging plant stalks or twigs. Consequently, cotton which would otherwise be lost by such collision by being knocked off onto the ground out of the path of the stripping means is saved by such shielding. Thus, the wheeled or runner means is so disposed as to permit the stripping mechanisms to first operate upon the plants without any interference whatsoever from the wheeled supporting means.

A further object of the present invention resides in the provision of a novel arrangement for controlling the operative disposition of each stripping mechanism independently of the other so that the height at which each mechanism runs above the ground surface may be controlled independently of the other.

Another object of the present invention resides in the provision of a novel arrangement for supporting the forward end of the stripping mechanisms in such a manner that each stripping mechanism may have vertical play irrespective of the disposition of the other mechanism to accommodate irregularities in the ground surface over which each mechanism runs. Thus, in the event that one mechanism encounters a slight elevation in the ground surface or should it encounter a depression in the ground surface, it will readily accommodate itself to such variation in the contour of the ground without effecting any change in the operative disposition of the other stripping mechanism. The arrangement is such in addition, that should a gully be encountered by either mechanism, such mechanism is suitably counterbalanced to carry it over so as to eliminate the possibility of jarring of the mechanism upon its encounter with the high side of the gully or depression upon completion of its passage thereover.

Since each stripping mechanism is preferably provided with guide means for guiding the plants of the row operated upon therebetween for concentrating the plants along a predetermined passage for operation thereupon by the stripping mechanism, it is desirable that the guide means be maintained at all times in positive lateral alignment so that such passage in which the plants are guided be uniformly defined at all times. To this end, it is a further object of the present invention to provide a means for positively holding the guide means of each stripping mechanism in transverse alignment so as to provide a substantially rigid structure preventing separation of the guide means.

Another object resides in the provision of improved power take-off connections, broadly shown in my copending application mentioned above, for operation of the movable elements of the entire harvesting mechanism by the power means of the tractor and in the provision of power lift means for effecting operative and inoperative disposition of portions of the harvesting mechanism so that such portions of the mechanism may be readily disposed for operating upon plants or inoperative disposition thereof effected for transport purposes.

Other and further features and advantages of the present invention will appear from the following detailed description of a preferred embodiment of the invention illustrated in the accompanying drawings in which.

Figures 1, 2, 9:
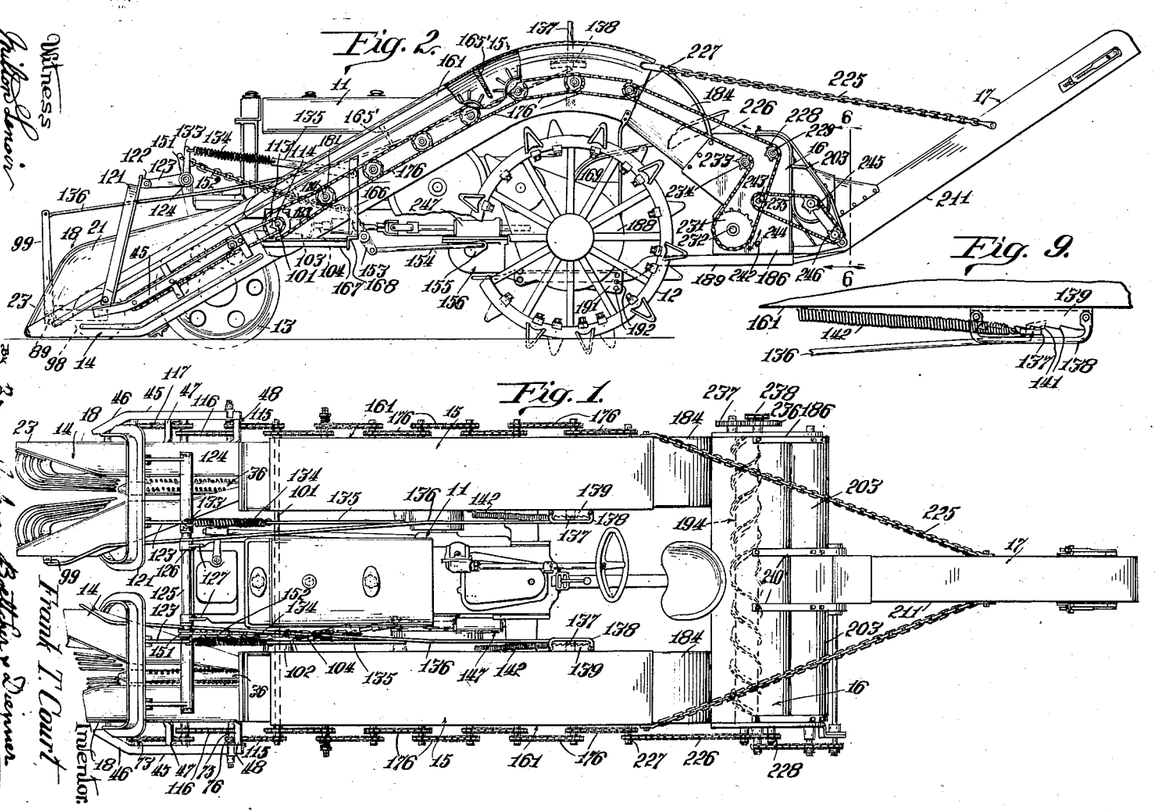
Figure 1 is a plan view of a harvester embodying the salient features of the present invention illustrated in assembled relation upon a general purpose tractor.
Figure 2 is a side elevation of the machine illustrated in Figure 1, parts being broken away to illustrate certain operating connections.
Figure 9 is a fragmentary plan view of the control means for one of the stripping mechanisms.

The preferred embodiment of the present invention is illustrated in the drawings particularly in Figures 1 and 2 in assembled position upon a tractor 11 having rear driving or traction wheels 12 and front dirigible wheels 13. The main operating devices of the harvester comprise stripping and elevating mechanisms 14, combined conveying and preliminary cleaning means 15, final cleaner 16, and a centrally disposed discharge elevator conveyor 17.

I shall first describe the stripping and elevating mechanisms 14 which are preferably mounted at the front and in advance of the tractor 11, the supporting means therefor, the control means, and the operating means. Since the two stripping and elevating mechanisms employed are substantial duplicates of each other, except, of course, that one is a left-hand mechanism and the other a right, I shall limit this portion of the description of their structure to one of them.

Figure 3:
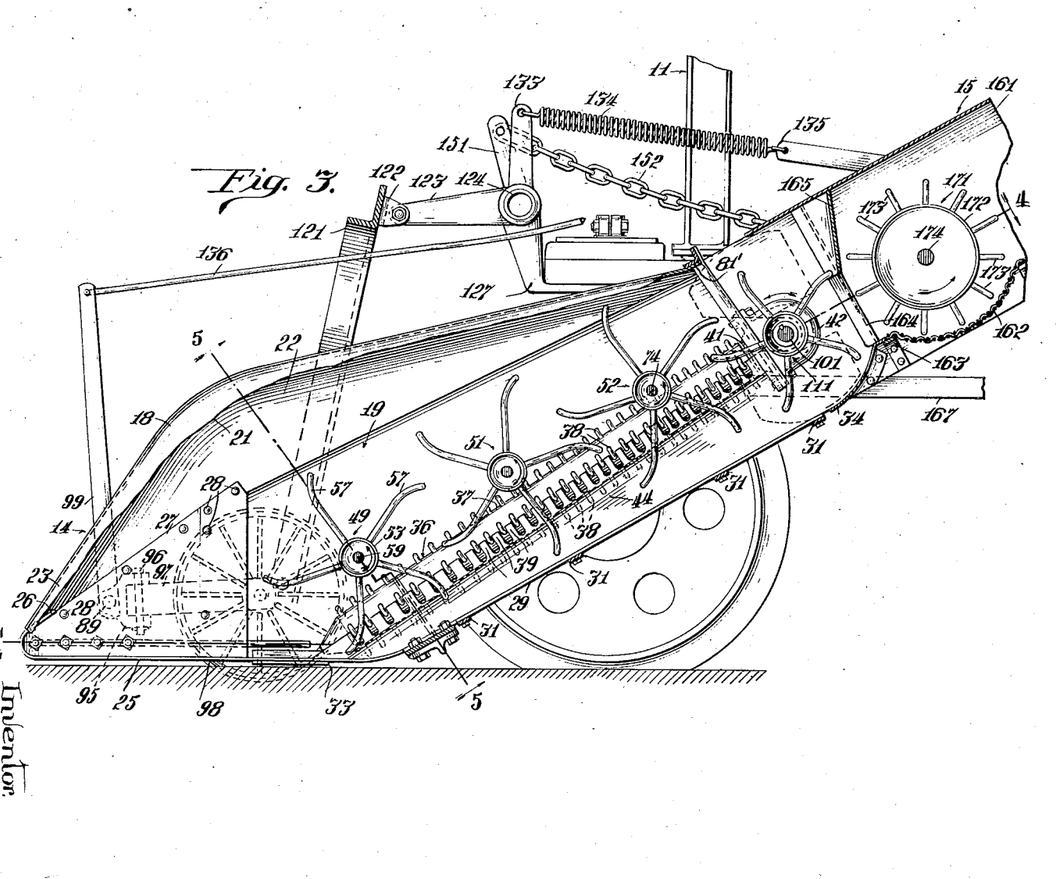
Figure 3 is an enlarged fragmentary section of one of the stripping mechanisms, such section being taken substantially centrally of the conveying and cleaning means of the left-hand stripping mechanism.
Figure 4:
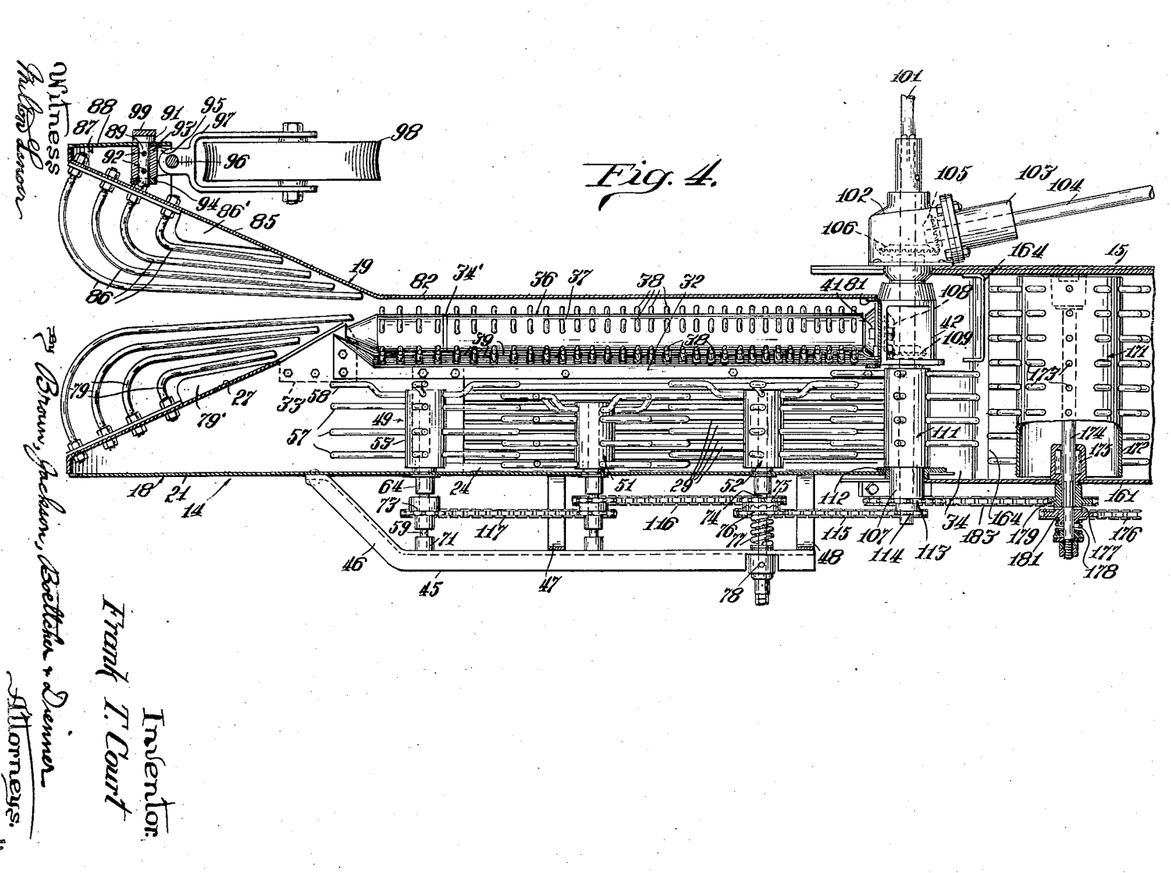
Figure 4 is a section through the stripping mechanism illustrated in Figure 3, such section being taken substantially along the line 4—4 of Figure 3.
Figure 5:
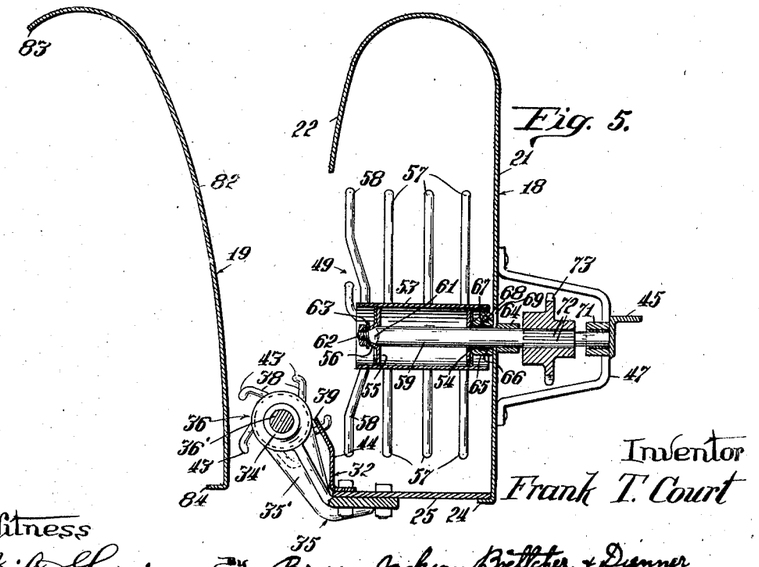
Figure 5 is a still further enlarged section taken transversely through the stripping mechanism illustrated in Figure 3, such section being taken substantially along the line 5—5 of Figure 3.

Referring more particularly to Figures 3, 4 and 5, it is to be noted that each stripping mechanism 14 is shown as embodying a single roll cotton stripping mechanism of the type shown in the patent to Bruce Morse, No. 1,950,902, issued March 13, 1934, and I therefore do not intend to claim as my invention any of the features claimed in said patent. In order, however, to illustrate the principles of my invention, I have shown each of the stripping units 14 as comprising a pair of component side plates 18 and 19, the former constituting the outer side member and the latter the inner side member. Member 18 comprises an elongated sheet metal body portion or side plate 21 formed along its upper edge with a reversely bent substantially U-shaped portion 22 extending downwardly from rear to front and terminating in a downwardly inclined nose or tip 23. Plate 21 is bent inwardly along its outer lower marginal edge to provide a ledge 24. Suitably secured to this ledge 24, adjacent the forwardmost end of plate 21 is a bottom plate 25 of substantially triangular formation, the tip of which terminates in a reversely bent nose portion 26. At the inner side of the side member 18, there is a substantially vertically disposed triangularly shaped plate 27 which is suitably secured to the bottom 25 and to the inner downwardly extending portion 22 of the plate 21 as by means of rivets or bolts 28. Extending rearwardly from the rear edge of bottom 25 are a plurality of parallel spaced slats 29 forming an upwardly and rearwardly extending bottom of this side of the stripping mechanism such slats being suitably reinforced and connected together by a plurality of cross members 31 extending transversely thereacross and disposed in longitudinal spaced relation with respect to the slats 29. At their outer ends cross members 31 are suitably connected to the ledge 24 of the side plate 21, the inner ends thereof being suitably secured to a longitudinally extending plate 32 secured at its front lowermost end to a toe plate 33, such toe plate being suitably secured to the bottom 25. At its upper rear end, side plate 21 has extending thereacross a substantially concave bottom plate 34 which is suitably secured at its inner margin to the inner side wall of the associated combined conveyor and preliminary cleaner 15.

Spaced rearwardly from toe plate 33 and secured to the underside of bottom 25 adjacent its rear edge and extending inwardly therefrom is a bracket 35 provided with an inwardly and upwardly directed portion 35' terminating in a bearing portion 34' providing a bearing for the lower end of a stripping roll 36. Stripping roll 36 comprises a two-part aligned tubular body 37 having an axial shaft 36' extending therethrough. Shaft 36' is supported in bearing portion 34' adjacent its lower end, the flanges of bearing portion 34' being disposed between and abutting the proximate ends of the two parts forming the body 37 of stripping roll 36. The body 37 is provided with a plurality of outwardly extending stripping fingers 38 arranged in longitudinally spaced relation upon the periphery of the roll to provide a plurality of circumferentially arranged aligned rows. The upper rear end of stripping roll shaft 36' is suitably journaled in a bearing bracket 41 secured to a journal bracket housing 42.

The fingers 38 of the stripping roll 36 are spaced closer together near the top of the roll than they are at the bottom of the roll. The bottom of the roll comes in contact with the stalk and heavier limbs of the plant, whereas the top of the roll comes in contact only with the smaller twigs. It is, therefore, desirable to have the pins or fingers spaced farther apart on the lower portion of the roll to permit the stalk and the larger branches to pass therebetween and to have the fingers at the upper end of the roll spaced closer together so as to be more effective in stripping cotton from the smaller twigs.

Referring more particularly to Figure 5, it will be noted that each of the fingers 38 is provided with an angularly bent end portion 43, the inclination of such bent portion being in a direction opposite to the normal rotaton of the stripping roll 36. Plate 32 is provided with a right angularly disposed vertical portion 44, the inner edge of which is bent outwardly so as to have the marginal edge thereof in close proximity to the periphery of the stripping roll 36, such angularly disposed marginal portion being suitably slotted or notched so as to accommodate the passage through the notches thereof of the stripping fingers 38 so that plate 32 in addition to functioning as a reinforcing plate for the inner edge of the bottom 25 and the slats 29 comprises a stripping plate for removing cotton and other matter stripped from the plants by the fingers 39 from these fingers. It will be noted that the inclination of the marginal edge of plate 32 is such that this portion of the plate cooperates with the inclined ends 43 of the fingers 38 that the stripped matter will be effectively removed from the fingers 38 inasmuch as the bent ends 43 leave the marginal edge in a path substantially normal to the plane of the marginal edge of the stripping plate, the bent ends 43 thus receding from the notches of the plate 32 substantially perpendicularly to the marginal portion of such plate, the stripping plate effecting removal of matter from the fingers 38 substantially axially of the bent ends 43. This arrangement does not constitute a part of the present invention and is more fully described in the copending application of Frederick A. Thomann, Serial No. 430,731, filed February 24, 1930, for Harvesters to which reference may be had.

A supporting frame comprising a main angle bar 45 provided with a forwardly and inwardly inclined end portion 46 is supported from the side plate 21 by having the extreme forward end suitably secured to plate 21, its rearwardly and upwardly directed portion being suitably braced to the outer side of the side plate 21 by means of a pair of longitudinally spaced substantially U-shaped brace brackets 47 and 48. A plurality of fingered members 49, 51 and 52 are suitably supported on the inner side of plate 21, members 49 and 52 being substantial duplicates of each other. Referring more particularly to Figure 5, each of these members comprises a hub 53 comprising a hollow tubular body provided internally adjacent the outer end thereof with a transverse web plate 54 having a substantially axial perforation therein, hub 53 being provided at its adjacent inner end with a reinforcing web plate 55 formed with a polygonally shaped axially extending portion 56. Hub 53 carries thereon a plurality of radially outwardly extending fingers 57 the outer ends of which are slightly curved in a direction opposite to the direction of rotation thereof, the innermost set of fingers 58 being slightly axially offset so as to be disposed in operative movement in a plane in close proximity to the ends of the stripping fingers 38 of the stripping roll 36. Fingers 57 and 58 may be suitably secured to hub 53 in any suitable or preferred manner.

Extending axially through the hub 53 is a shaft or spindle 59 provided at its inner end with a polygonally tapered end 61 adapted to be cooperatively associated with the correspondingly formed portion 56 of the reenforcing or web plate 55, the extreme end of spindle 59 being provided with a reduced threaded end 62 with which a suitable nut and washer 63 may be associated for retaining the hub 53 in position on the spindle 59. Shaft or spindle 59 passes through a suitable perforation provided in the side plate portion 21 of the component stripping member 18, the shaft being suitably journaled in a pair of opposed journal bearings 64 and 65 which are adapted to engage the outer and inner sides of the side plate 21 in assembled relation, respectively. The bearing member 65 is provided with a suitable bearing facing 66 which may be conveniently lubricated from a lubricating passage 67 normally closed by a plug 68 to prevent loss of lubricant during operation. The passage in the side plate 21 through which shaft or spindle 59 extends may be slightly elongated vertically as indicated at 69 for purposes of permitting access to the plug 68 and lubricant passage 67 when it is desired to lubricate bearing 65. To maintain the shaft or spindle 59 in horizontal alignment, the extreme outer end thereof is journaled in a bearing 71 suitably secured to the vertical flange of the angle member 45. The extreme outer end of shaft or spindle 59 is preferably reduced. Adjacent such reduced end, the shaft or spindle is provided with suitable splines 72 for cooperatively receiving thereon a sprocket 73.

Fingered member 51 is of substantially the same general structure as member 49 with the exception that it is slightly shorter in its hub portion, the fingers thereof being adapted to pass the fingers of the fingered member 49 in partially overlapping and staggered relation. The shaft or spindle thereof is similarly journaled in the side plate 21 and upon the angle iron member 45. The sprocket member of fingered member 51 differs from that associated with the fingered member 49 in that two sets of sprocket teeth are provided thereon, such sprocket teeth being disposed in axially spaced relation.

The hub, finger, and journal bearing structures of the fingered member 52 are similar to those of the fingered member 49. The shaft or spindle 74 of fingered member 52 being substantially longer and extending outwardly beyond the vertical flange of the angle iron member 45. Sprocket 75 is provided with a slip-clutch hub portion adapted to cooperate with a similarly formed hub portion of a second sprocket 76 which has axial sliding movement with respect to the shaft or spindle 74, the cooperative relationship of the two hub portions being normally maintained by a coil spring 77. The tension of coil spring 77 may be effectively controlled by any suitable or desired tensioning means 78 disposed upon the end of shaft or spindle 74. The purpose of the slip-clutch arrangement will more specifically hereinafter appear. It will be noted that the fingered member 52 is disposed in substantially the same position laterally of the side plate 21 as the fingered member 49, the fingers of the former cooperating in the same manner with the fingers of the fingered member 51, that is, the fingers of member 52 are adapted to pass the fingers of the member 51 in axially spaced overlapping and staggered relation.

At the forward end of the component portion 18 of the stripping mechanism, a plurality of inwardly and rearwardly directed guide fingers 79 are suitably secured to the vertical plate 27 for purposes of guiding the plants to the stripping roll 36 in the course of the passage of the machine down the row of plants. To prevent cotton from falling between the innermost guide finger and plate 27, a guard plate 79' is secured to the plate and extends horizontally into the space between the innermost finger and plate 27. Adjacent the rear edge thereof, the reversely bent portion 22 of the component member 18 is suitably secured along its vertical edge to a substantially U-shaped plate 81, the web portion of which is clamped between the journal bracket portion 41 and the associated portion of the journal bracket 42. The inner leg of the U-shaped bracket 81 is suitably secured to the outer vertical edge of the component member 19 along the rear edge thereof for purposes of securing a substantially rigid association of the component members 18 and 19. The rigid association of the component members 18 and 19 at the rear ends thereof is further secured by an angle iron bracket 81' fixed to the upper edge of plate 81 and suitably secured to the component members 18 and 19 in any preferred or desired manner (see Figure 3). Component member 19 comprises a downwardly and forwardly inclined curved body portion 82 being provided at its upper edge with a reversely bent inwardly directed portion 83 and along its lower marginal edge with an inwardly directed flange 84 for purposes of substantially reinforcing such lower edge. At its forward end, the plate portion 82 is flared outwardly to provide a component plate portion 85 for the oppositely flared end plate portion 27 of the component member 18. At its forward end and in opposed relation to the fingers 79, a similar series of rearwardly directed guide fingers 86 are provided to cooperate with guide fingers 79 in guiding the stalks, branches and twigs of the plants of the plant row being operated upon therebetween to the stripping roll 36. A guard plate 86' similar to plate 79' is secured in the same manner between the innermost of guide fingers 86 and plate portion 85. It will be readily apparent that the plate portion 82 of the component member 19 cooperates with the fingers 38 of the stripping roll 36 by providing a substantial backing for the plants as they are led back through the stripping mechanism in the forward movement of the machine along the plant row.

At its extreme tip, the component member 19 is provided with a toe plate 87 suitably secured to the flared portion 85 and extending laterally outwardly therefrom. This toe plate is provided with a vertical flange 88 in which a horizontal spindle or shaft 89 is journaled, such spindle or shaft being provided with an enlarged head 91 adapted to engage the outer side of the vertical portion 88 of plate 87. Suitably secured to this shaft or spindle 89 as by means of a pair of transverse pins 92 is a bracket 93 disposed between a vertically extending supporting bracket 94 and the inner face of the vertical portion 88 of the plate 87. This bracket is provided with a rearwardly extending fork 95 between the tangs of which is supported for horizontal pivotal movement about a pin 96, a caster fork 97 supporting a ground engaging caster wheel 98 in the forked end thereof. A lever 99 is suitably secured to the enlarged head 91 of the pin or shaft 89 for a purpose to be more specifically hereinafter described.

The stripping roll 36 and the combined conveying and preliminary cleaning fingered members 49, 51, and 52 are driven from a shaft 101 extending horizontally through the side walls at the forward end of the associated combined conveying and preliminary cleaning means 15, secured to the inner wall of which is a gear box 102 provided with a rearwardly extending journal bearing 103. A power take-off shaft 104 is journaled in the bearing 103 and extends inwardly in the gear box 102 carrying at its inner end a suitable beveled gear 105 which meshes with a cooperating beveled gear 106 suitably keyed or otherwise secured to the shaft 101. The shaft 101 extends through the outer side wall of the combined conveying and preliminary cleaning means 15 being suitably journaled in such side wall in a bearing 107. Bearing bracket 42 is suitably journaled upon the shaft 101 adjacent the inner side wall of the combined conveying and preliminary cleaning means 15, the shaft 36' of the stripping roll 36 extending upwardly therethrough and carrying at its extreme inner end and suitably keyed or otherwise secured thereto a bevel gear 108 which meshes with a cooperating bevel gear 109 suitably keyed or otherwise secured to the shaft 101 within the bearing bracket 42. Between the outer end of bearing bracket 42 and the outer wall of the combined conveying and preliminary cleaning means 15, shaft 101 carries thereon a fingered member 111 similar in construction to the fingered members 49, 51 and 52 with the exception that the inner end set of fingers are not laterally bent, such fingered member 111 being suitably keyed or otherwise secured to the shaft 101 in any preferred or desired manner. The extreme upper end of the side plate 21 of the component member 18 has suitably secured thereto a bearing 107. Thus, the stripping mechanism by virtue of being pivotally associated with the shaft 101 through the bearing bracket 42 and with the bearing 107 through the bearing 112, may have vertical pivotal movement with respect to the combined conveying and preliminary cleaning means 15.

Adjacent its extreme outer end, shaft 101 has suitably keyed or otherwise secured thereto a pair of sprockets 113 and 114, the latter being suitably connected to the clutching sprocket 76 by means of a sprocket chain 115 and thereby providing a drive connection for the fingered members 49, 51 and 52 through the sprockets associated with the shafts of the fingered members by means of sprocket chains 116 and 117.

Figure 8:
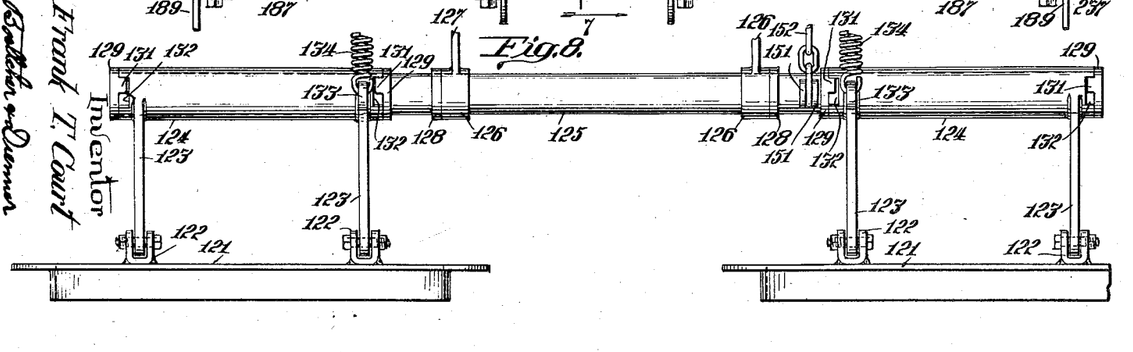
Figure 8 is an enlarged fragmentary plan view of a portion of the stripping mechanism supporting means.

The two component parts 18 and 19 of each stripping mechanism are preferably supported by a U-shaped inverted frame 121 having the lower ends of the legs thereof suitably pivotally connected one to each of the outer sides of the component mechanisms 18 and 19. Preferably, the frame 121 is formed of angle iron. Referring now more particularly to Figure 8, the vertical flange of the intermediate portion of the frame 121 has suitably secured thereto in spaced relation, a pair of brackets 122. Each of these brackets is pivotally connected with a forwardly extending arm 123 integrally associated with a tubular member or sleeve 124. Sleeve 124 is carried by a horizontally disposed tubular shaft 125 suitably supported in the ears 126 of a pair of spaced arms 127 secured to the forward end of the tractor frame. Shaft 125 is maintained against axial displacement by a pair of collars or rings 128 secured to shaft 125 and abutting the outer opposed sides of the journal portions 126 of the arms 127.

Sleeves 124 are retained in position upon the ends of the shaft 125 by a pair of abutting collars 129 suitably secured to the shaft 125. Each of the collars 129 is provided with a laterally inwardly directed lug 131 cooperating with an elongated notch 132 provided in the end of sleeve 124 thereby providing a lost motion connection between shaft 125 and sleeve 124. The rear ends of the inner arms 123 are provided with vertically, right angularly extending arms 133. The upper ends of these arms 133 have one end of a coil spring 134 suitably anchored therewith, the rear ends of the coil springs 134 being suitably anchored to the forward ends of rearwardly extending rigid links 135 having their rear ends pivotally connected with the frame work supporting the combined conveyors and preliminary cleaners 15.

The upper end of lever 99 associated with the caster wheel supporting structure, has a rod 136 connected thereto, such rod extending rearwardly to a control means connected to and carried by the inner side wall of each combined conveyor and preliminary cleaner 15. Referring now more particularly to Figure 9, this control means comprises a lever 137 pivotally supported at its lower end upon the inner side wall of the associated combined conveying and preliminary cleaning means 15, the lever being loosely supported for slight swinging movement away from the associated wall under lateral pressure imposed thereupon. The upper end of the lever 137 extends upwardly through a space defined by a guard rod 138 of substantially U-shaped configuration and having the leg portions thereof suitably secured to a toothed plate 139 in turn secured to the inner side wall of the combined conveying and preliminary cleaning means. Lever 137 is adapted to yieldingly engage the teeth 141 of the plate 139 to be retained in desired adjusted positions. One end of a coil spring 142 is anchored to the lever 137, the other end of such spring being suitably anchored to the adjacent side wall of the combined conveying and preliminary cleaning means forwardly of the locking plate 139 so that the lever is normally urged forwardly and inwardly to co-operative engagement with the teeth 141. The rear end of rod 136 extends through the lever 137 intermediate the ends thereof and above the pivot thereof. It will be readily apparent that upon rearward swing of the lever 137, rod 136 transmits a clockwise movement to the lever 99 causing the caster fork 97 to move in a clockwise direction about its pivot pin 89 whereupon upon engagement of the caster wheel 98 with the ground surface, the forward end of the stripping mechanism will be elevated. Thus, the vertical displacement of the forward end of the stripping mechanism with respect to the ground surface may be controlled within predetermined limits of adjustment by an operator seated upon the tractor. Since the supporting frame 121 of each stripping mechanism has lost motion connection with the supporting tubular shaft 125, it will be readily apparent that the stripping mechanisms may have vertical play within the limits of the lost motion connection to readily accommodate themselves to the contour of the ground over which the mechanism is operated. Thus, in a machine provided with two stripping mechanisms supported in the manner herein disclosed, each mechanism may have vertical play with respect to the other mechanism within predetermined limits, of course, in the event one or the other of the stripping mechanisms encounters hillocks or gullies while the other is traveling over substantially level, smooth ground. It will of course be further noted that since the amount of play provided between the supporting sleeve 124 and the supporting shaft 125 is limited, should a depression of material depth be encountered by either mechanism, the forward end of the mechanism will be readily carried over thereby eliminating the possibility of damage to the stripping mechanism due to shock incident to collision with the high side of a ditch or gully over which the mechanism has passed. Springs 134 serve to effectively counterbalance the stripping mechanisms so as to eliminate sudden shock apt to be transmitted thereto in the event that the caster wheels should drop into a suddenly encountered depression or sudden leaving of the ridge of a hillock or mound over which the caster wheel may pass.

In operation, each stripping mechanism has the plants of the row being operated upon led to the stripping roll thereof by the fingers 79 and 86. The plants are maintained in position for effective stripping by the stripping roll 36 by the side portion 82 of the cooperating component member 19. Cotton and other foreign matter stripped from the plants are carried around over the high side of the stripping roll whence it is removed by the stripping plate 32 and deposited upon the bottom of the component portion 18 of the stripping mechanism. The outer fingers of the fingered members 49, 51 and 52 cooperate with the stripping plate in removing the cotton and foreign matter from the stripping roll by engaging such matter and directing it upwardly along the slotted bottom of the component portion 18 of the stripping mechanism. It is to be noted that the present type of conveying means functions to burst the cotton bolls and simultaneously beats and agitates the cotton as it is carried rearwardly of the stripping mechanism. There is thus no tendency to pack or mat the cotton in the course of its passage to the combined conveying and preliminary cleaning means. As the gathered matter is conveyed in turn rearwardly by the fingered members 49, 51 and 52, foreign matter may freely drop through the slats 29. It will be of course readily apparent that the reversely bent portion 22 of the component portion 18 of the stripping mechanism serves as a hood to prevent cotton from being thrown upwardly and outwardly of the component portion 18 to prevent loss of such matter as may be thrown up by the fingered members 49, 51 and 52. Should foreign matter of substantial size interefere with the free operation of the fingered members 49, 51 and 52, causing one or all of these members to be stopped, the slip clutch means associated with the shaft of the fingered member 52 will slip thereby insuring against any breakage of parts of the fingered members due to such resistance.

Since the supporting frame 121 is a substantially rigid frame, it will readily serve to maintain the two component members 18 and 19 in transverse alignment and will further insure of the proper disposition of the component member 19 upon variations in the disposition of the caster frame 97. By disposing the caster wheel 98 on the inner side of each stripping mechanism, each caster wheel is suitably shielded from engagement with plant twigs or branches since by the time that the caster wheel approaches the plants they will already have been guided between the component portions 18 and 19 of the stripping mechanism. It will of course be understood that the function of each caster is to maintain the forward end of the stripping mechanism in the desired elevated position with respect to the ground surface.

To facilitate dirigible movement of the combined tractor and mechanism and to dispose the stripping mechanisms in inoperative position for transport purposes, I have provided a power operated lifting mechanism for the stripping mechanisms. Such power operated means includes a pair of parallel arms 151 suitably secured to the shaft 125 as by welding, and extending upwardly therefrom, a rearwardly extending flexible means such for example as a chain 152 having its forward end suitably anchored to and between the upper ends of arms 151 (see Figures 3 and 8). Referring now more particularly to Figure 2, chain 152 has its rear end suitably anchored to the upper end of a lever 153 supported for swinging movement about a suitable pin disposed in the supporting frame for the two combined conveying and preliminary cleaning means 15 adjacent the left-hand one of these, such lever being of the first class. The lower end of lever 153 has a connecting link 154 pivotally associated therewith at its forward end, such link being pivotally connected at its rear end with a crank arm 155 of a power lift mechanism 156 on the tractor 11. Upon counterclockwise movement of the crank arm 155 as viewed in Figure 2, the upper end of lever 153 will be moved in a clockwise direction transmitting a clockwise rotation to the shaft 125 through the chain 152. When the lugs 131 engage the rear ends of the notches 132, rotative movement is imparted to the sleeves 124 causing arms 123 to elevate the frames 121 thereby elevating the forward ends of the stripping mechanisms about the shaft 101 as a pivot. Thus, the stripping mechanisms are elevated completely free of the ground surface providing for unimpeded dirigibility of the tractor for transport purposes or for reverse turning thereof upon completion of harvesting of the plants of a pair of plant rows for operation upon the next adjacent rows.

Shaft 101 provides a common operating shaft for both sets of mechanisms and extends across the underside of the tractor through suitable perforations providing the opposed longitudinal side frame members of the tractor.

Since the combined conveying and preliminary cleaning means 15 for both stripping mechanisms 14 are substantial duplicates of each other, it will suffice to briefly describe the one associated with the left-hand stripping mechanism, reference being had particularly to Figures 3 and 4. Each combined conveying and preliminary cleaning means comprises a vertically curved housing 161 closed at the top and the sides thereof and provided with a coarsely reticulated screen 162 forming the bottom thereof. At its reception end, the screen 162 is supported by a transverse bracket 163 which also has the rear edge of the concave plate 34 suitably connected thereto. Since the last fingered member 111 disposed at the discharge end of the associated stripping mechanism is considerably shorter in length than the width of the associated combined conveying and cleaning means, a baffle wall 164 is provided to close off the space to the rear of the bearing bracket 42 to prevent return delivery of matter being conveyed and cleaned by the combined conveying and preliminary cleaning means to the stripping mechanism. Associated with the baffle wall 164 is a second baffle plate 165 extending across the upper portion of the space defined by the top and side walls of the combined conveying and preliminary cleaning means, such baffle plate being inclined rearwardly to direct such matter as may be thrown up by the fingers of the last fingered member 111 rearwardly of the housing 161. Similarly, a plurality of spaced apart baffle plates 165' are provided between pairs of beater drums 171 to prevent cotton from being thrown back over the beater drums toward the forward end of the mechanism. These plates 165' preferably extend downwardly to a point where the fingers of the drums just clear the lower edges of the plates. This arrangement prevents the return of cotton to the first drum thereby avoiding overloading thereof. As will be readily apparent from Figure 2, the rear portion of the combined conveying and preliminary cleaning means 15 is curved upwardly and rearwardly and then downwardly so as to be disposed above and to clear the periphery of the rear driving wheel of the tractor.

Each mechanism is supported at its forward end upon a pair of substantially U-shaped brackets 166 and 167, disposed at right angles to each other with the intermediate portions thereof suitably secured to the respective flanges of a transversely extending angle bar 168 which extends across the underside of the tractor and is suitably associated with the frame of the tractor providing a common support for the two combined conveying and preliminary cleaning means 15. At the rear end, each combined conveying and preliminary cleaning means 15 is supported upon a pair of vertically disposed brackets 169.

Each combined conveying and preliminary cleaning means 15 has mounted therein in longitudinally spaced relation, a series of beaters 171, any preferred or desired number of which may be employed. Each beater 171 comprises a sheet metal drum or hub 172 provided with a series of radially outwardly projecting fingers 173. Each drum is fixedly secured upon a shaft 174 (Figure 4) journaled in suitable anti-friction bearings 175 supported in the two side walls of the mechanism, each shaft extending through the outer side wall, where the shafts are connected one with another through sprocket and chain connections 176. Preferably, the foremost beater 171 disposed at the reception end of the mechanism is provided with a slip-clutch 177 normally maintained in cooperative engagement by a pressure spring 178, the slip-clutch 177 providing a connection between the driving sprocket 179 and the driven sprocket 113. Driving sprocket 179 is driven from the sprocket 113 carried by the shaft 101 by a sprocket chain 183.

Preferably, the screen 162 is bent to partially conform to the curvature of the outer peripheries of the beaters 171, the high points of the screen being suitably supported upon a series of spaced apart brackets similar to bracket 163.

For a more specific description of the details of construction of each combined conveying and preliminary cleaning means 15, reference may be had to my copending application hereinbefore referred to.

In operation, as the stripped material is received by the foremost beater 171, it is picked up by the fingers 173 thereof and forced around underneath the beater over the upper side of the screen 162 to a point where the next beater row comes into contact therewith. As has been hereinbefore pointed out the baffle wall 164 and the baffle plate 165' prevent matter thrown upwardly by the fingers of the first beater from gaining entry back to the stripping mechanism. The successive beating and conveying function of the beater rolls is repeated from one roll to the next throughout the preliminary cleaner. The beater rolls are operated at a very high velocity so that due to such velocity, foreign matter such as small sticks, burrs, and bolls are broken up and the greater part thereof forced down between the mesh of the screen 162 and deposited on the ground. As the stripped matter progresses from the reception end of the combined conveying and preliminary cleaning means to the discharge end thereof, a substantial portion of the foreign matter will be removed until the cotton containing very little foreign matter is finally discharged by the last beater roll into a chute 184 which discharges into one of the two receiving hoppers or openings 185 of a final cleaner 16 (see Figure 6).

The final cleaner 16 comprises a substantially rectangular housing 186 open at the bottom and forward side, and supported at its rear edge upon an angle iron 187 extending transversely across and to the rear of the tractor 11 and in turn supported from the sides of the gear housings 188 of the tractor by a pair of rearwardly extending angle iron members 189, the forward ends of which are preferably pivotally connected to the lower forward edge of gear housing 188. A pair of brackets 191 are suitably secured to the inner walls of the gear housings 188 and are provided adjacent their rear ends with a plurality of vertically disposed perforations 192 which are adapted to adjustably receive a securing pin for maintaining the rearwardly extending angle iron arms 189 in desired vertically adjusted position. Angle iron 187 preferably extends across the rear lower edge of the final cleaning means 16 so as to provide a support therefor.

Figure 7:
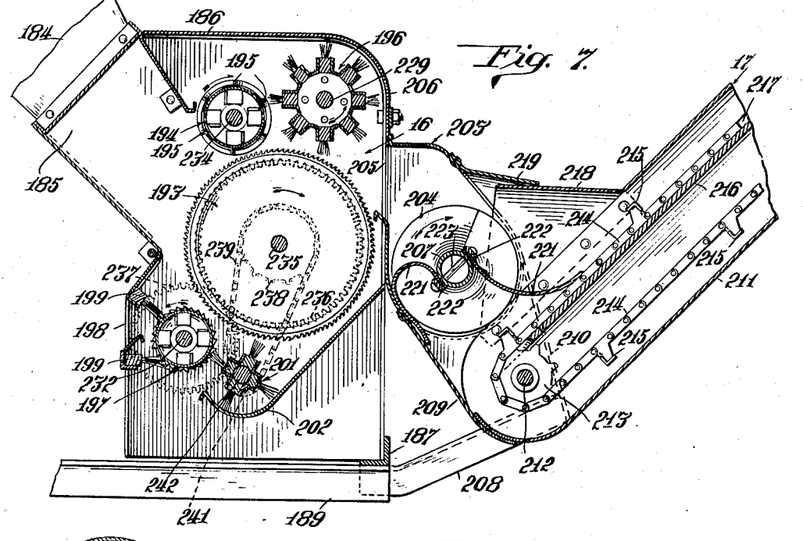
Figure 7 is a section through the final cleaning means taken substantially along the line 7—7 of Figure 6.

Referring now more particularly to Figure 7, the final cleaning means comprises a relatively large drum 193 journaled substantially centrally of and in the side walls of the housing 186, and provided with a plurality of peripherally supported, axially abutting rings each having peripheral saw-tooth projections cut therein and pointing in the direction of rotation of the drum which is indicated by the arrow shown in Figure 7. Journaled in the side walls of the housing 186 and positioned slightly forwardly of and above the drum 193, is another smaller drum 194 having a series of spiral ridges 195 extending longitudinally of the periphery thereof. A doffer drum 196 comprising a plurality of peripheral, radially outwardly extending brushes, is positioned above and preferably slightly to the rear of the vertical axial plane of the drum 193, the brushes being adapted to brush the saw-tooth projections on the drum 193 in a direction rearwardly of the housing 186. A second sawtooth surfaced drum 197 is journaled in the side walls of the housing 186 below and preferably slightly forwardly of the drum 193. A refuse opening 198 is provided in the front wall of the housing 186 in proximity to the drum 197. Fixed brushes 199 are provided along the transverse edges of the opening 198 and are so arranged that the upper brush will brush the surface of drum 197 for discharging refuse through the opening 198, while the lower brush similarly removes refuse adapted to be discharged through the open bottom of the housing 186. A second doffer 201 provided with a plurality of peripheral brushes, is journaled in the side walls of the housing 186 and is positioned rearwardly of and slightly below the drum 197 and is adapted to brush the saw-teeth of the drum 197. A baffle plate 202 is arranged to extend across the housing 186 from the rear thereof downwardly beneath the drum 193 and underneath the second doffer 201 providing a discharge opening between its forward edge and lower brush 199. Brush 201 rotates in a clockwise direction as viewed in Figure 7 to remove cotton from drum 197 and to direct such removed cotton to the drum 193.

Suitably secured to the rear side of the final cleaner housing 186 is an auger conveyor housing 203 extending across the rear side of the final cleaner 16. The housing 203 carries therein at each side an auger 204 which is adapted to convey matter received from the final cleaning mechanism through a discharge opening 205 toward the axial center of the entire mechanism.

Figure 6:
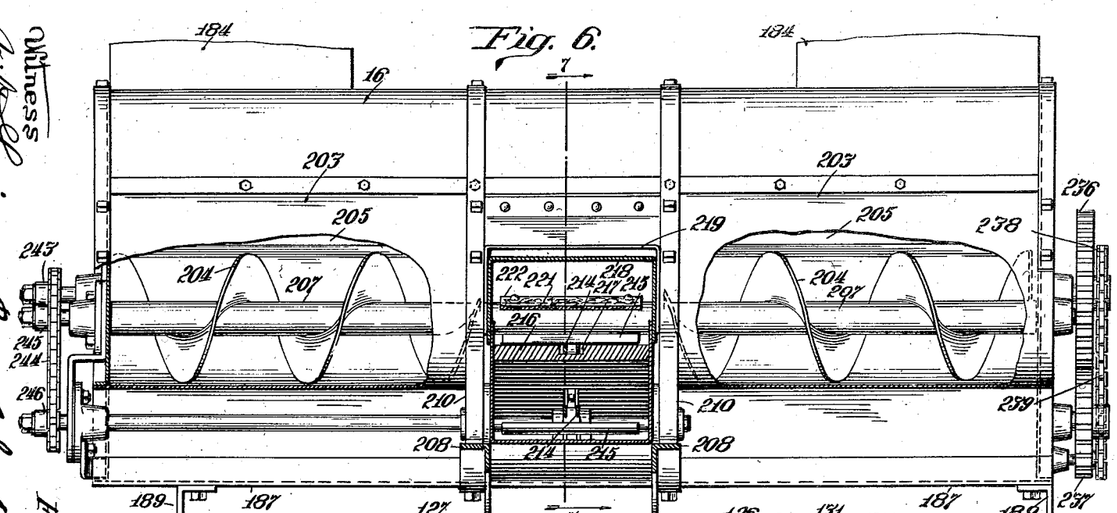
Figure 6 is an enlarged rear end view of the final cleaning means, parts being broken away, the view being taken substantially along the line 6—6 of Figure 2.

Referring now more particularly to Figure 6, augers 204 are preferably mounted upon a common tubular shaft 207, the augers 204 terminating at their inner ends in spaced relation providing a discharge space therebetween.

A discharge elevator conveyor 17 adapted to receive matter discharged by the auger 204 has its reception end disposed in the space defined between the discharge ends of the augers 204. This conveyor 17 is supported upon a pair of rearwardly extending angle iron arms 208 suitably secured at their forward ends to the transversely extending angle iron 187 in spaced relation substantially midway of member 187 and extends forwardly into the intermediate portion of a substantially U-shaped housing 209 communicating with a central opening housing 203, the rear edges of housing 209 being suitably reinforced by straps 210 suitably secured at their lower ends to the extreme rear ends of the supporting arms 208 and defining the inner reinforcing edges of the housing 209.

Conveyor and elevator 17 comprises a housing 211, the forward lower end web portion of which is formed upon an arc to conform to the curvature of the lower rear end of the web portion of housing 209 and to cooperate therewith upon vertical swinging movement of the conveyor and elevator 17 for varying the elevation of the discharge end thereof for accommodation to transport vehicles adapted to receive cotton discharged by the entire mechanism and which may be suitably connected by any preferred or desired draft means to the tractor. A shaft 212 is suitably journaled adjacent the forward lower end of the housing 211 and extends through the side walls of the housing 209 providing a pivot for the housing 211. Shaft 212 carries thereon a sprocket 213 disposed centrally of the side walls of the housing 211, a suitable sprocket chain 214 cooperating with the sprocket wheel 213 and provided with a plurality of transverse arms 215 comprising the conveyor means. The upper end of the endless chain 214 may be similarly carried over a suitable idler sprocket wheel.

Extending across and suitably secured to the side walls of the housing 211 is a supporting plate 216 upon which the chain 214 is adapted to ride in a longitudinally extending guide groove 217, the upper surface of plate 216 serving as a support for the cross arms 215 and for cotton discharged thereupon by the augers 204. At the reception end, housing 211 is provided with a suitable enclosing canopy 218 cooperating with a rearwardly extending shield 219 secured to the upper side web portion of housing 203, the canopy 218 being disposed inwardly of the shield 219 a sufficient distance to accommodate vertical adjustments of the conveyor and elevator 17.

That portion of shaft 207 which is disposed in the space defined between the augers 204 and is confined in the housing 209, has secured thereto a pair of flexible flap members 221 with the inner ends thereof extending tangentially of the shaft 207 and being suitably retained thereon by a pair of diametrically opposed metal strips 222 in turn secured to the shaft 207 by means of a plurality of bolts or rivets 223. Flaps 221 are considerably longer than the radial dimension of the augers 204 so that in passing over the web portion of the housing 209 they will be reversely bent as shown in Figure 7. As each flap 221 approaches the discharge opening 205, it tends to straighten out so that such matter as is being discharged by the opposed augers 204 is received thereupon and due to centrifugal force when the end of the flap member 221 is freed from the web portion of the housing 209, it will straighten out and carry the discharged cotton over to the upper supporting side of the plate 216 for engagement thereof by the conveyor chain and cross members thereof. In passing over the conveyor, each flap member 221 is flexed in the opposite direction forming a guard baffle for such matter as is about to be thrown rearwardly by the succeeding or following flap thereby insuring of positive feeding of the discharged cotton to the conveyor. This eliminates the possibility of congestion at the reception end of the conveyor.

Referring to Figure 2, it will be noted that the conveyor 17 is suitably braced from the rear ends of the combined conveying and preliminary cleaning means housings by a pair of chains 225. These chains may have adjustable connection at either end with the associated mechanism of any preferred or desired form so that the angular disposition of the conveyor 17 may be adjusted to be accommodated to transport vehicles of varying heights.

Referring now more particularly to Figures 1, 2, 6 and 7, the final cleaning means, auger conveyors, and discharge conveyors are operated as follows:

A sprocket chain 226 is driven by a suitable sprocket wheel 227 secured to the outer extending end of the shaft of the last beater roll of the combined conveying and preliminary cleaning means 15. This chain has its upper run passing over a sprocket 228 suitably secured to the outwardly extending end of the shaft 229 of the upper doffer 196 thence around a large sprocket 231 suitably secured to the outwardly extending end of shaft 232 of the second toothed drum 197, the lower run of chain 226 then passing over a sprocket 233 secured to the outer extending end of shaft 234 of the spreading drum 194. Thus the toothed drum 197, spreader drum 194 and doffer 196 are consequently driven by the same chain 226 with the toothed drum 197 and doffer 196 rotating in the same direction while the spreader drum 194 is rotated in the opposite direction as indicated by the arrows in Figure 7. On its inwardly extending end, shaft 235 of the toothed drum 193, and outwardly of the housing 186, has a spur gear 236 suitably keyed or otherwise secured thereto, such gear meshing with a similarly disposed gear 237 secured to the inner extending end of the shaft 232 of the toothed drum 197. Beyond the spur gear 236, shaft 235 also has a sprocket 238 secured thereto with which a chain 239 cooperates to drive a sprocket 241 secured to the inner extending end of shaft 242 of the lower doffer 201. Thus, the drum 193 is driven from the drum 197, drum 193 in turn furnishing driving power to the doffer 201.

On its outwardly extending end, shaft 235 carries a sprocket 243 suitably keyed or otherwise secured thereto over which a sprocket chain 244 passes. The upper run of chain 244 passes over a sprocket 245 secured to the outwardly extending end of shaft 207, and thence over a sprocket 246 suitably secured to the outer extending end of the shaft 212, returning over the sprocket 243. Thus the augers and the conveyor 17 are driven from the cleaning drum 193.

The operation of the final cleaning mechanism 16 has not been described in detail since it is substantially the same as that described in my copending application hereinbefore referred to, and reference may be had thereto for a more detailed description of the function and operation of the final cleaner.

Shaft 104 which furnishes the main driving power for the entire mechanism, has its rear end suitably connected with a power take-off means 247 preferably associated with the power lift mechanism 156 (see Figure 2).

It will be readily apparent that in operation, the entire harvesting and cleaning function of the machine is substantially a continuous operation from stripping mechanisms to the final discharge of the preliminary and finally cleaned cotton from the discharge end of the conveyor 17 into the transport vehicle.

If desired, a suitable receptacle retaining means may be provided at the discharge end of the conveyor 17 for purposes of removably receiving the upper open ends of flexible portable receptacles such for example as baskets or bags which may be successively filled and then loaded upon a conveyance for transport to the gin.

If desired, a suitable shield of the canopy type may be provided upon the outer side of each stripping mechanism 14 to shield the sprocket and chain connections transmitting power to the fingered members 49, 51 and 52. The other side walls of the combined conveying and preliminary cleaning means 15 may be similarly provided with a covering shield 248 to shield the sprocket and chain connections 176.

While I have disclosed what I deem to be a preferred embodiment of my invention, it will be understood that I do not wish to be limited thereto. As will be understood by those skilled in the art, certain changes may be made therein without departing from the essence of the invention or the spirit and scope of the appended claims.

What I claim and desire to secure by Letters Patent is:

1. A cotton harvesting machine comprising row-following, plant stripping means extending in a generally longitudinal direction, and conveying means for receiving cotton from said stripping means, said conveying means including rotary elements also serving to remove foreign matter from the cotton, said last named means extending generally rearwardly alongside the longitudinally disposed stripping means and effective for continuous operation from stripping to discharge of the cotton.

2. A cotton harvesting machine comprising a pair of row-following, plant stripping units, each including a pair of stationary component members adapted to guide plants therebeteween, and a downwardly and forwardly inclined stripping means carried by one of said members adapted to cooperate with the other of said members for removing cotton from said plants as the latter are guided therebetween, conveying means for each unit including a plurality of rotary elements adapted to convey the cotton rearwardly from said stripping means, and a common operating unit adapted to receive the cottons from the conveying means for each of said pair of units.

3. A row-following stripping mechanism for cotton harvesting machines comprising a pair of component members, one of said members providing a continuous wall, the other of said members including stripping means adapted to cooperate with said wall for removing cotton from plants guided between said members and concurrently acting conveying and cleaning means including a plurality of rotatable members having arms adapted to strike the cotton and convey the same from said stripping means.

4. A row-following stripping mechanism comprising a pair of forwardly and downwardly inclined component members, one of said members providing a continuous guiding wall, a roll having outwardly directed fingers extending from the periphery thereof rotatably supported on the other of said members, said fingers being adapted to cooperate with said wall for stripping cotton from plants guided between said component members, a stripping plate on said last named member adapted to remove cotton from said roll for deposit within said member, an open-work bottom in said member, and a plurality of fingered members supported in said member for conveying cotton rearwardly of said member and for concurrently removing foreign matter from the cotton for deposit upon the ground through said bottom.

5. A row-following stripping mechanism comprising a pair of forwardly and downwardly inclined component members, one of said members providing a continuous guiding wall, a roll having outwardly directed fingers extending from the periphery thereof rotatably supported on the other of said members, said fingers being adapted to cooperate with said wall for stripping cotton from plants guided between said component members, a stripping plate on said last named member adapted to remove cotton from said roll for deposit within said member, and a plurality of successively disposed rotattable fingered elements in said member adapted to act upon cotton received within said member for concurrently conveying the cotton rearwardly of said member and for removing foreign matter from the cotton, the fingers of said fingered elements being adapted to pass each other in overlapping and staggered relation.

6. A row-following stripping mechanism comprising a pair of forwardly and downwardly inclined component members, one of said members providing a continuous guiding wall, a roll having outwardly directed fingers extending from the periphery thereof rotatably supported on the other of said members, said fingers being adapted to cooperate with said wall for stripping cotton from plants guided between said component members, a stripping plate on said last named member adapted to remove cotton from said roll for deposit within said member, and a plurality of successively disposed rotatable fingered elements in said member adapted to act upon cotton received within said member for concurrently conveying the cotton rearwardly of said member and for removing foreign matter from the cotton, the fingers of said fingered elements being adapted to pass each other in overlapping and staggered relation, certain of said fingers being adapted to cooperate with said stripping plate to remove cotton from said roll.

7. A row-following stripping mechanism for cotton harvesting machines comprising a pair of forwardly extending component members, one of said members providing a continuous wall, the other of said members including a stripping means adapted to cooperate with said wall for removing cotton from plants guided between said members, and ground engaging means carried wholly by said first named member adjacent the forward end thereof for guiding said stripping means over the ground.

8. A row-following stripping mechanism for cotton harvesting machines comprising a pair of component members, one of said members providing a continuous wall, the other of said members including stripping means adapted to cooperate with said wall for removing cotton from plants guided between said members, and ground engaging means carried at the forward end of said first named member, said ground engaging means being shielded by said member.

9. A row-following stripping mechanism for cotton harvesting machines comprising a pair of component members, one of said members providing a continuous wall, the other of said members including stripping means adapted to cooperate with said wall for removing cotton from plants guided between said members, ground engaging means carried at the forward end of said first named member, said ground engaging means being shielded by said member, and means controlling the disposition of said ground engaging means relative to said member whereby the disposition of the forward ends of said members relative to the ground surface may be varied.

10. A cotton harvesting machine adapted to be carried by a tractor comprising a pair of forwardly and downwardly inclined component members supported forwardly of the tractor, combined conveying and preliminary cleaning means carried by the tractor and extending rearwardly thereof, adjustable ground engaging means carried by one of said component members, and control means for said ground engaging means carried by said combined conveying and preliminary cleaning means and adapted to effect adjustable disposition of said ground engaging means relative to said component members for varying the disposition of said component members relative to the ground.

11. A cotton harvesting machine adapted to be carried by a tractor, including a row-following, plant stripping means supported in advance of the tractor comprising a pair of component members, means pivotally connected with said members and connecting said members together for maintaining said members in transverse rigidity, and power lift means carried by said tractor and associated with said connecting means for imparting raising and lowering movement to said component members through said connecting means.

12. A cotton harvesting machine adapted to be carried by a tractor, including a row-following, plant stripping means supported in advance of the tractor comprising a pair of component members, means connecting said members together for maintaining said members in transverse rigidity, and means connected with said connecting means for elevating or lowering said component members including a lost motion connection to accommodate rise and fall of said component members incident to slight variations in ground surface contour.

13. A cotton harvesting machine adapted to be carried by a tractor including two sets of row-following, plant stripping means supported in advance of the tractor, each set comprising a pair of component members adapted to guide a plant row therebetween, means connected to each pair of component members for maintaining said members in transverse rigidity adjacent the forward ends thereof, ground engaging means supporting the forward ends of each set of said stripping means, a shaft supported at the forward end of the tractor, power lift means associated with said shaft, and lost motion connections between said shaft and said component member connecting means for accommodating independent rise and fall of each set of component members incident to slight variations in ground surface contour.

14. A cotton harvesting machine adapted to be carried by a tractor including two sets of row-following, plant stripping means supported in advance of the tractor, each set comprising a pair of component members adapted to guide a plant row therebetween, means connected to each pair of component members for maintaining said members in transverse rigidity adjacent the forward ends thereof, ground engaging means supporting the forward ends of each set of said stripping means, a shaft supported at the forward end of the tractor, power lift means associated with said shaft, lost motion connections between said shaft and said component member connecting means for accommodating independent rise and fall of each set of component members incident to slight variations in ground surface contour, and counterbalancing means for each set of component members independent of said power lift connections.

15. A two-row cotton harvesting machine adapted to be carried on a tractor and comprising a pair of row-following, plant stripping means spaced apart laterally a distance equal to the distance between two adjacent plant rows, a combined conveying and preliminary cleaning means disposed on each side of the tractor and arranged to receive the cotton from said stripping means, final cleaning means disposed at the rear of the tractor for receiving cotton from each of said combined conveying and preliminary cleaning means, a common elevator conveyor adapted to receive cotton discharged by said final cleaning means, and means for postitively delivering cotton discharged by said final cleaning means to said elevator conveyor.

16. A cotton harvesting machine comprising row-following, plant stripping means, conveyor means associated therewith, a single final cleaner receiving cotton from said conveyor means, oppositely acting auger conveyors receiving cotton discharged by said cleaner and conveying the cotton toward the center of the cleaner, said conveyors terminating in spaced relation at their inner ends, an elevator conveyor having its reception end disposed in the space defined by said inner ends, and flexible means adapted to receive cotton from the inner ends of said auger conveyors and adapted to deposit the cotton upon said elevator conveyor.

17. A cotton harvesting machine comprising row-following, plant stripping means, conveyor means associated therewith, a single final cleaner receiving cotton from said conveyor means, auger conveyors receiving cotton discharged by said cleaner, said conveyors terminating in spaced relation at their inner ends and adapted to conduct the cotton toward the space defined by said inner ends, a common shaft for said auger conveyors traversing said space, an elevator conveyor having its reception end disposed in said space below said shaft, and flexible members secured to said shaft in said space and adapted to wipe over the reception end of the elevator conveyor for positively delivering cotton discharged by said auger conveyors to the elevator conveyor.

18. A cotton harvesting machine comprising row-following, plant stripping means and including rotatable arms adapted to forcibly strike the stripped matter to concurrently convey and agitate the same to remove foreign matter therefrom, said rotatable arms being arranged in a series disposed alongside said plant stripping means.

19. A cotton harvesting machine comprising row-following, plant stripping means comprising a pair of component members adapted to guide plants therebetween, rotatable stripping means carried by one of said members and adapted to cooperate with the other of said members for removing cotton from said plants, means carried by said one of said members for removing cotton from said stripping means, means for receiving cotton from said removing means, and means cooperating with said receiving means for concurrently conveying and removing foreign matter from cotton delivered to the receiving means and comprising a plurality of rotatable agitating means carried by one of said members and adapted to agitate the cotton in the course of its conveyance.

20. The combination with a tractor, of cotton harvesting mechanism comprising a pair of row-following, plant stripping means, a pair of combined conveying and preliminary cleaning means, one of said combined conveying and cleaning means being carried on each side of the tractor and adapted to receive cotton from each of said stripping means and to convey such cotton rearwardly of the mechanism, and a single final cleaning mechanism adapted to receive the cotton from both of said combined conveying and preliminary cleaning means.

21. The combination with a tractor, of cotton harvesting mechanism comprising a pair of row-following, plant stripping means, a pair of combined conveying and preliminary cleaning means, one of said combined conveying and cleaning means being carried on each side of the tractor and adapted to receive cotton from each of said stripping means and to convey such cotton rearwardly of the mechanism, and a single final cleaning mechanism adapted to receive the cotton from both of said combined conveying and preliminary cleaning means, said last named means discharging into the final cleaning mechanism adjacent the ends thereof, said final cleaning mechanism comprising a housing, a drum extending across the entire housing and having means to retain cotton discharged thereto, and means comprising a second drum cooperating with said drum to distribute cotton received by the latter drum, said second drum including spiral ridges directed helically inwardly from the ends of the drum whereby the distribution of the cotton received by the receiving drum is effected from the ends toward the center of the receiving drum.

22. A cotton harvesting machine comprising row-following plant stripping means including a stripping roll disposed in a downwardly and forwardly inclined position, preliminary cleaning and conveying means disposed alongside said stripping roll and comprising a plurality of rotatable members and a bottom wall disposed adjacent said members, and cleaning mechanism including a plurality of rotatable beaters and a bottom wall having openings therein, the bottom wall of the beater being disposed adjacent the upper end of the bottom wall of said preliminary cleaning and conveying means.

23. A cotton harvesting machine comprising row-following plant stripping means, conveying means for receiving cotton from said stripping means, said conveying means including a plurality of rotary elements also serving to remove foreign matter from the cotton and a bottom wall disposed closely adjacent said rotary elements, and cleaning means receiving the cotton from the rear end of said conveying means and including a plurality of beater elements and a bottom wall disposed in longitudinal alignment with the bottom wall of said conveying means, whereby the movement of the cotton is continuous from the conveying means to the beater elements.

24. A cotton harvesting machine comprising downwardly and forwardly inclined row-following plant stripping means, conveying means also forwardly and downwardly inclined and adapted to receive cotton from said stripping means, said conveying means including a plurality of rotatable arms adapted, when rotated, to agitate the cotton to remove foreign matter therefrom, said conveying means also including a bottom wall having openings therein to discharge the foreign matter, and cleaning means having a forward portion also downwardly and forwardly inclined and including a plurality of beater elements and a bottom wall also provided with openings and extending downwardly and forwardly in alignment with the bottom wall of the conveying means, said bottom wall for the beater elements having arcuate portions disposed closely adjacent the path of movement of said elements.

25. A row-following stripping mechanism for cotton harvesting machines and the like comprising stripping roll having a plurality of outwardly extending fingers thereon, said fingers being spaced closer together near one end of the roll than they are at the other end of the roll, and means cooperating with said fingers for removing cotton from the cotton plants.

26. A row-following stripping mechanism for cotton harvesting machines and the like comprising a stripping roll including a rotatable body having outwardly extending fingers thereon, the spacing of said fingers progressively decreasing from the bottom to the top of the roll, and means cooperating with said fingers in the removal of cotton from the cotton plants.

27. A cotton harvesting machine comprising a supporting frame, a transversely disposed drive shaft journaled thereon, a row-following plant stripping unit pivotally connected with said drive shaft for vertical movement relative to said frame, elevating mechanism adapted to receive cotton from said unit and to convey the same rearwardly of the frame, said mechanism being driven from said shaft, and combined conveying and preliminary cleaning means carried by said frame and operatively driven from said shaft.

28. A cotton harvesting machine comprising a supporting frame, a transversely disposed drive shaft journaled thereon, a row-following plant stripping unit supported in a downwardly and forwardly inclined position and pivotally supported at its rear end for vertical swinging movement about the axis of said shaft, said unit including rotatable stripping means driven from said shaft, elevating mechanism disposed alongside said rotatable stripping means and adapted to receive cotton therefrom, said mechanism comprising rotatable means also driven from said shaft and swingable vertically about the axis thereof with said unit, and combined conveying and preliminary cleaning means adapted to receive cotton from said elevating mechanism and including rotatable members also driven from said shaft.

29. A cotton harvesting machine comprising a supporting frame, a transversely disposed drive shaft journaled thereon, means for driving said shaft, sprockets on said shaft, combined conveying and preliminary cleaning means carried by said frame and including rotatable members driven from one of the sprockets on said shaft, stripping means pivotally supported at one end on said shaft for vertical swinging movement with respect to the forward end of said combined conveying and preliminary cleaning means, said stripping means including downwardly and forwardly inclined stripping rolls, bevel gear means driving said stripping rolls from said shaft, and elevating means for conveying cotton from said stripping means to said combined cleaning and conveying means, said elevating means including rotatable members driven from another sprocket on said shaft.

30. A two-row cotton harvesting machine adapted to be carried on a tractor and comprising a pair of row-following, plant stripping means spaced apart laterally a distance equal to the distance between two adjacent plant rows, a combined conveying and preliminary cleaning means disposed on each side of the tractor and arranged to receive the cotton from said stripping means, and a common elevator adapted to receive cotton from both of the conveying and preliminary cleaning means.

31. A cotton harvester comprising a tractor having a power take-off shaft, similar units arranged at opposite sides of and extending longitudinally of the tractor and each including gathering or picking mechanism and a cleaning mechanism operatively connected with said shaft, the gathering or picking mechanism being arranged at opposite sides of the front portion of the tractor, the cleaning mechanism being located rearwardly of the gathering or picking mechanism for receiving cotton therefrom, axially aligned conveyors located at the rear end of the tractor for receiving cotton from the cleaning mechanisms, and an elevator located at the rear end of the tractor and having its receiving end arranged between the conveyors.

32. A cotton harvester comprising a tractor, a gathering or picking mechanism located at one side of the tractor, ground contacting means carried by said mechanism, means yieldingly suspending said mechanism from the tractor, a cleaning mechanism located rearwardly of said first mechanism and adapted to receive cotton therefrom, means mounting said cleaning mechanism on the tractor, and means pivotally connecting said gathering or picking mechanism to the cleaning mechanism.

FRANK T. COURT.